US011965357B2

(12) United States Patent
Bowley

(10) Patent No.: US 11,965,357 B2
(45) Date of Patent: Apr. 23, 2024

(54) DETAINER DISC LOCKING SYSTEM WHICH FORMS A DEVIATED PICKING PATH

(71) Applicant: BOWLEY LOCK COMPANY INC., Calgary (CA)

(72) Inventor: Ryan Thomas Bowley, Calgary (CA)

( * ) Notice: Subject to any disclaimer, the term of this patent is extended or adjusted under 35 U.S.C. 154(b) by 332 days.

(21) Appl. No.: 17/398,242

(22) Filed: Aug. 10, 2021

(65) Prior Publication Data

US 2022/0056731 A1 Feb. 24, 2022

Related U.S. Application Data

(60) Provisional application No. 63/077,147, filed on Sep. 11, 2020, provisional application No. 63/069,233, filed on Aug. 24, 2020.

(51) Int. Cl.

| | |
|---|---|
| ***E05B 29/00*** | (2006.01) |
| ***E05B 15/14*** | (2006.01) |
| ***E05B 19/00*** | (2006.01) |
| ***E05B 21/06*** | (2006.01) |
| ***E05B 27/00*** | (2006.01) |

(52) U.S. Cl.

CPC .......... *E05B 29/0013* (2013.01); *E05B 15/14* (2013.01); *E05B 19/0041* (2013.01); *E05B 21/066* (2013.01); *E05B 27/0021* (2013.01); *E05B 27/0082* (2013.01); *E05B 29/0066* (2013.01); *E05B 2027/0025* (2013.01)

(58) Field of Classification Search

CPC .. E05B 15/14; E05B 19/0017; E05B 19/0041; E05B 21/06; E05B 21/066; E05B 27/0021; E05B 27/0082; E05B 29/0013; E05B 29/0066

See application file for complete search history.

(56) References Cited

U.S. PATENT DOCUMENTS 2,552,012 A * 5/1951 O'Kane .................. E05B 27/00 70/419
2,682,764 A * 7/1954 Kotab ..................... E05B 27/00 70/419

(Continued)

FOREIGN PATENT DOCUMENTS

| | | |
|---|---|---|
| EP | 0989262 | 3/2000 |
| GB | 665137 | 1/1952 |
| WO | 2016112454 | 7/2016 |

*Primary Examiner* — Christopher J Boswell

(74) *Attorney, Agent, or Firm* — Ryan W. Dupuis; Kyle R. Satterthwaite; Ade & Company Inc.

(57) ABSTRACT

A locking system has a lock cylinder rotatable within a lock housing and a side bar movable relative to channels within the lock cylinder and lock housing between locked and released conditions of the lock cylinder. An idler block within the lock cylinder has a key channel receiving a key therein so that the key and idler block rotate together relative to the lock cylinder. Annular detainer discs are received between the idler block and the lock cylinder, each having an outer gate channel and an inner key bit such that keyed surfaces of the key engage the key bits when rotated to align the gate channels with the side bar and enable the release of the side bar to unlock the cylinder relative to the housing. A stationary shield may be fixed relative to the housing, about which the idler block rotates to restrict access to the detainer discs.

20 Claims, 14 Drawing Sheets

(56) References Cited

U.S. PATENT DOCUMENTS

| | | | | |
|---|---|---|---|---|
| 4,370,875 | A * | 2/1983 | Piiroinen | E05B 21/066<br>70/366 |
| 4,686,843 | A * | 8/1987 | Martikainen | E05B 21/066<br>70/366 |
| 5,490,405 | A * | 2/1996 | Ramo | E05B 21/066<br>70/366 |
| 6,079,239 | A * | 6/2000 | Hsiao | E05B 29/00<br>70/358 |
| 6,155,089 | A * | 12/2000 | Hurskainen | E05B 47/0642<br>70/366 |
| 6,799,447 | B2 * | 10/2004 | Mielonen | E05B 21/066<br>70/366 |
| 6,826,936 | B1 * | 12/2004 | Ming-Er | E05B 29/0013<br>70/377 |
| 9,447,607 | B2 * | 9/2016 | Malinen | E05B 21/066 |
| 10,240,364 | B2 * | 3/2019 | Wehr | E05B 21/066 |
| 10,428,556 | B2 * | 10/2019 | Bowley | E05B 27/006 |
| 11,306,507 | B2 * | 4/2022 | Bowley | E05B 27/0082 |
| 11,591,822 | B2 * | 2/2023 | Wang | E05B 29/0013 |
| 2020/0123807 | A1 | 4/2020 | Bowley | |
| 2021/0381275 | A1 * | 12/2021 | Wunderlich | E05B 21/066 |
| 2022/0170293 | A1 * | 6/2022 | Kinnunen | E05B 21/066 |

* cited by examiner

DETAINER DISC LOCKING SYSTEM WHICH FORMS A DEVIATED PICKING PATH

This application which claims the benefit under 35 U.S.C. 119(e) of U.S. provisional application Ser. No. 63/069,233, filed Aug. 24, 2020 and U.S. provisional application Ser. No. 63/077,147, filed Sep. 11, 2020.

FIELD OF THE INVENTION

The present invention relates to a locking system of the type using detainer discs which are rotated using a key to release a side bar to unlock rotation of a lock cylinder relative to a surrounding lock housing, and more particularly, the present invention relates to a detainer disc locking system that uses a deviated key for accessing the detainer discs which are partially obstructed so as to form a deviated picking path which is highly resistant to lock picking.

BACKGROUND

In a conventional detainer disc locking system, detainer discs are rotatably supported within a lock cylinder and are rotated to respective unlocking orientations using a key, which in turn releases a side bar to unlock rotation of a lock cylinder relative to a surrounding lock housing. In the conventional detainer disc locking systems, the key must interact directly with an inner opening of each disc so that the picking path from the keyhole to the discs are typically unobstructed and may be subject to picking. Also in a conventional detainer disc locking system, rotation of discs is only permitted in one direction to displace the discs to a locked configuration and in an opposing direction to displace the discs to an unlocking configuration. Once in the unlocked configuration, continued rotation of the key to operate the lock cylinder relative to the lock housing can only occur in unlocking direction of rotation of the key, as the opposing rotation of the key will simply return the discs to the locked configuration rather than operate the lock cylinder relative to the lock housing in a second direction of rotation.

SUMMARY OF THE INVENTION

According to one aspect of the invention there is provided a detainer disc locking system comprising:

- a key;
- a lock housing including a face plate with a keyhole for receiving the key and a first side bar channel formed in the lock housing;
- a lock cylinder disposed within the lock housing so as to be selectively rotatable relative to the lock housing, the lock cylinder including a second side bar channel formed in the lock cylinder;
- a side bar at least partially received within the second side bar channel and being movable between a first position in which the side bar traverses a shear plane between the lock cylinder and the lock housing such that the lock cylinder is fixed relative to the lock housing and a second position in which a shear plane between the lock housing and the lock cylinder is uninterrupted by the side bar so as to enable rotation of the lock cylinder relative to the lock housing;
- an idler block disposed within the lock cylinder, the idler block including a key channel receiving the key therein such that the idler block is rotatable with the key relative to the lock cylinder; and
- a plurality of detainer discs disposed within the lock cylinder, each detainer disc being annular in shape and being supported about the idler block so as to be rotatable relative to the lock cylinder, and each detainer disc further comprising (i) a gate channel formed at an outer edge of the detainer disc such that the detainer disc blocks movement of the side bar into the second position until the gate channel is aligned with the second side bar channel and (ii) a key bit formed at an inner edge of the detainer disc;
- the idler block at least partially blocking access to the detainer discs;
- the key including a plurality of keyed surfaces forming a key profile of the key, each keyed surface being aligned with a respective one of the detainer discs such that rotation of the key relative to the lock housing in an unlocking direction towards an unlocking orientation of the key causes the keyed surfaces of the key to engage the key bits of the detainer discs respectively so as to align the gate channels of the detainer discs with the second side bar channel in the lock housing.

Preferably the locking system further includes a stationary shield supported in fixed relation to the lock housing in which the stationary shield is disposed within the idler block such that the idler block rotates about the stationary shield.

Preferably the key is a deviated key including a shaft portion defining an axis of rotation of the key and a deviated member spaced from the axis of rotation of the key for rotation about the stationary shield in which the keyed surfaces of the key are located on the deviated member of the key.

Use of an idler block operatively supported within the picking path between the key channel and the detainer discs at least partly blocks access along a picking path between the keyhole and the detainer discs to make picking of the lock more difficult. By further providing a stationary shield and a deviated key with keyed surfaces of the key being rotated about the stationary shield, access to the detainer discs is further restricted to further prevent picking of the locking system.

When the key includes a connecting portion extending between the shaft portion and the deviated member, the stationary shield may comprise a tubular body having an opening extending axially along one side of the tubular body through which the connecting portion of the key is received when the key is inserted through the keyhole into the lock housing.

The stationary shield may be supported on the face plate of the lock housing.

The idler block may include a plurality of peripheral channels formed in an outer surface thereof to extend in a circumferential direction about the idler block, in which each peripheral channel is aligned with a respective one of the detainer discs so as to receive the key bit of the respective detainer disc circumferential slidable therein as the idler block is rotated relative to the detainer discs.

Each detainer disc may further comprise a return bit formed at the inner edge of the detainer disc at a location spaced circumferentially from the key bit, whereby rotation of the key in a locking direction opposite to the unlocking direction away from the unlocking orientation causes the detainer discs to be rotated through engagement of the return bits so as to misalign the gate channels with the side bar. In this instance, the idler block may include a return surface formed thereon which is arranged to engage the return bits when the key is rotated in the locking direction so as to cause the detainer discs to be rotated and the gate channels to be misaligned with the side bar.

The locking system may further comprise a stop formed on the key that is arranged to block release of the side bar into the second position in a first translational position of the key relative to the lock housing. In this instance, the key may be movable translationally relative to the lock housing from the first translational position to a second translational position while the key is in the unlocking orientation, while the side bar is movable into the second position in the second translational position of the key relative to the lock housing. The key may further comprise a ramp surface formed thereon, in which the ramp surface is arranged to engage the side bar to urge the side bar from the second position to the first position thereof as the key is displaced translationally from the second translational position to the first translational position.

The locking system may further comprise a spacer disc supported between each adjacent pair of the detainer discs in an axial direction, in which the spacer discs each have a prescribed thickness in the axial direction. In this instance, the key may be movable translationally between the first translational position and the second translational position by a distance which is less than the prescribed thickness of the spacer discs.

The key may further include a protrusion formed thereon. In this instance, a notch may be formed within the lock cylinder that is arranged to receive the protrusion on the key when the key is displaced translationally into the second translational position, in which the lock cylinder is coupled to the key for rotation together when the protrusion is received within the notch. The protrusion preferably blocks translational movement of the key from the first translational position to the second translational position until the key is rotated into the unlocking orientation to align the protrusion on the key with the notch in the lock cylinder.

The locking system may further comprise rotational stops supported on each of the lock cylinder and the idler block that engage at opposing ends of a prescribed range of rotational movement between the lock cylinder and the idler block to prevent relative rotation beyond said prescribed range of rotational movement. In the illustrated embodiment, the rotational stops comprise a pin on a wall of the lock cylinder and a slot extending in a circumferential direction within the idler block, in which the slot receives the pin therein such that movement of the pin between opposing ends of the slot defines said prescribed range of rotational movement between the lock cylinder and the idler block.

According to a second aspect of the present invention there is provided a method of operating a detainer disc locking system comprising (i) a lock housing, (ii) a lock cylinder disposed within the lock housing, (iii) a side bar preventing rotation of the lock cylinder relative to the lock housing in a locked configuration, and (iv) a plurality of detainer discs disposed within the lock cylinder to prevent release of the side bar from the locked configuration while the detainer discs remain in a blocking configuration, the method comprising:

- inserting a key into the idler block within the lock housing;
- rotating the key relative to the lock housing from a first angular orientation to a second angular orientation so as to release the detainer discs from the blocking configuration;
- blocking the release of the side bar from the locked configuration using the key in the second angular orientation in a first translational position of the key; and
- moving the key translationally relative to the lock housing while in the second angular orientation from the first translational position to a second translational position to release the side bar from the locked configuration.

The method may further include inserting a protrusion on the key into a notch within the lock cylinder when moving the key translationally relative to the lock housing into the second translational position such that the lock cylinder rotates with the key.

The method may further comprise moving the side bar into the locked configuration by engaging the side bar with a ramp formed on the key while displacing the key from the second translational position to the first translational position.

The method may also further comprise blocking translational movement of the key in the first angular orientation from the first translational position to the second translational position using the protrusion on the key and rotating the key from the first angular orientation to the second angular orientation to align the protrusion on the key with the notch in the lock cylinder.

Furthermore, an idler block may be rotatably disposed within the lock cylinder to partially block access to the detainer discs.

Allowing the key to be displaced translationally in the unlocking angular orientation of the key allows the key to be fixed relative to the lock cylinder in the unlocking configuration of the discs. Once the key is fixed relative to the lock cylinder with the side bar in an unlocked position, the lock cylinder can be operated in either one of two opposing directions of rotation relative to the lock housing. The resulting locking system which allows operation of the lock cylinder in two opposing directions once unlocked allows the detainer disc locking system of the present invention to be used in many more applications than conventional detainer disc lock systems that are limited to operation of the lock cylinder relative to the lock housing in a single direction of rotation.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
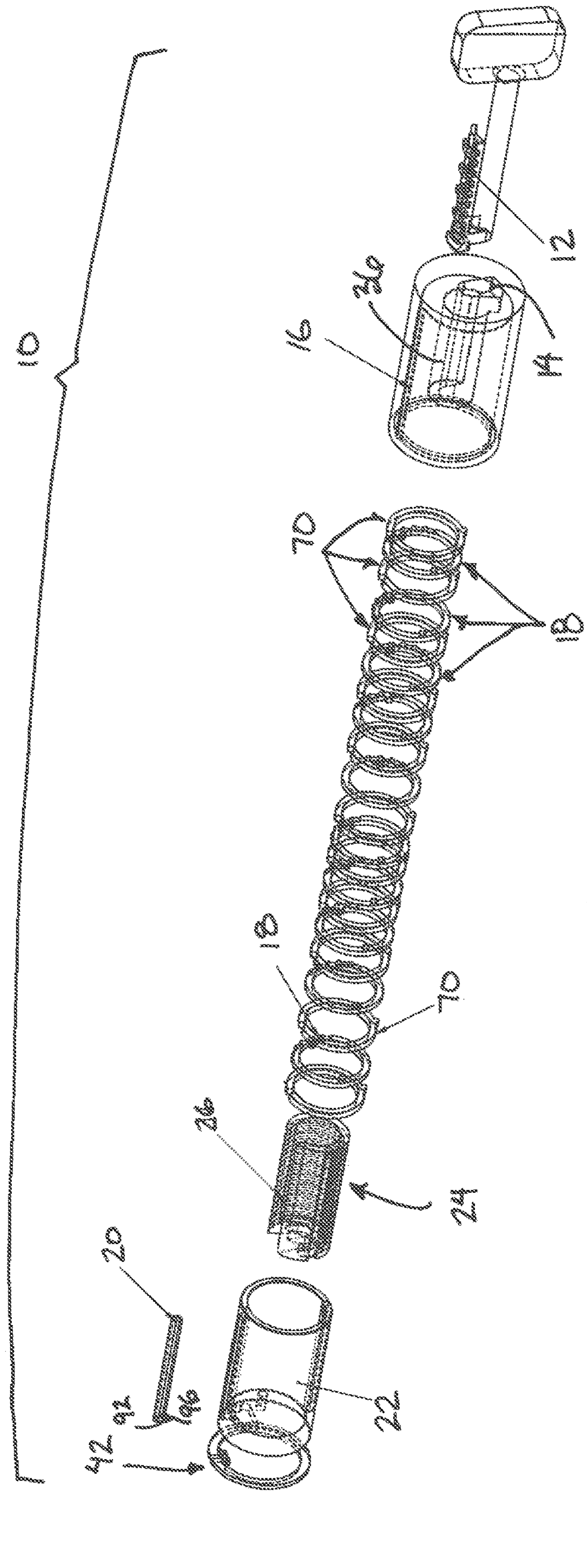
FIG. 1 is an exploded perspective view of the detainer disc locking system.

Referring to the accompany figures there is illustrated a detainer disc locking system generally indicated by reference numeral 10.

The locking system 10 generally includes a key 12 which is inserted into a lock assembly. The lock assembly has a keyhole 14 within a lock housing 16 of the lock assembly that receives the key so that subsequent rotation of the key drives rotation of detainer discs 18 within the lock housing into an unlocking configuration. The key may then be further displaced translationally within the lock housing to allow a side bar 20 to be released from a blocking position bridging a shear plane between the lock housing 16 and a lock cylinder 22 disposed within the locking housing. Further rotation of the key then drives the lock cylinder relative to the lock housing. An idler block 24 within the lock cylinder defines a key channel 26 to receive the key 12 therein such that the key and the idler block are rotatable together relative to the lock housing. The idler block at least partially blocks access to the detainer discs 18 to produce a deviated picking path between the keyhole 14 and the detainer discs 18.

Figure 2:
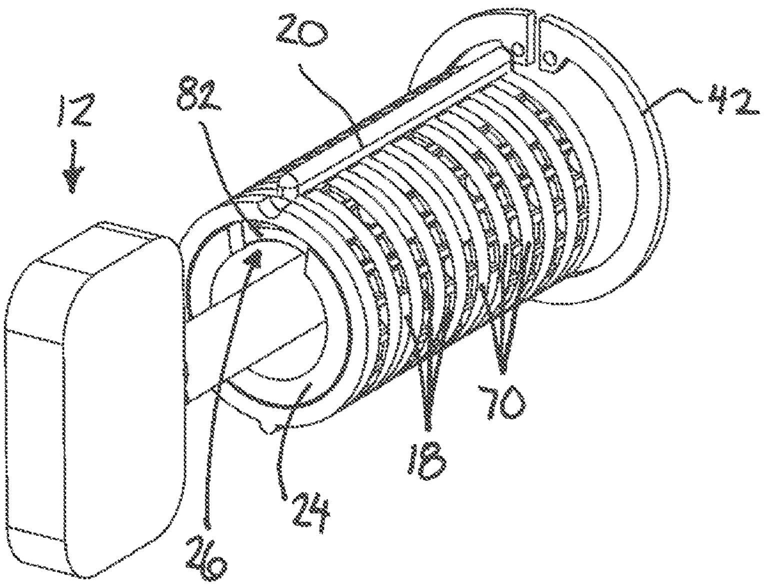
FIG. 2 is a perspective view of the locking system according to FIG. 1 with the lock housing removed for illustrative purposes.
Figure 3:
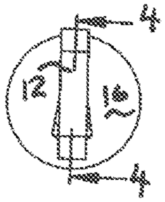
FIG. 3 is an end view of the locking system.
Figure 5:
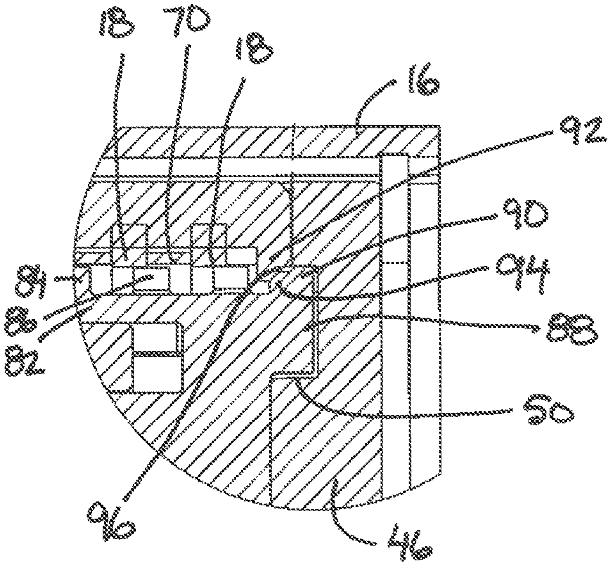
FIG. 5 is an enlarged view of a portion of the section view of FIG. 4.
Figure 4:
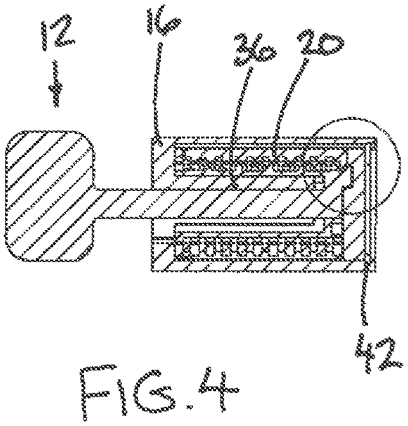
FIG. 4 is a sectional view along the line 4-4 in FIG. 3.
Figure 6:
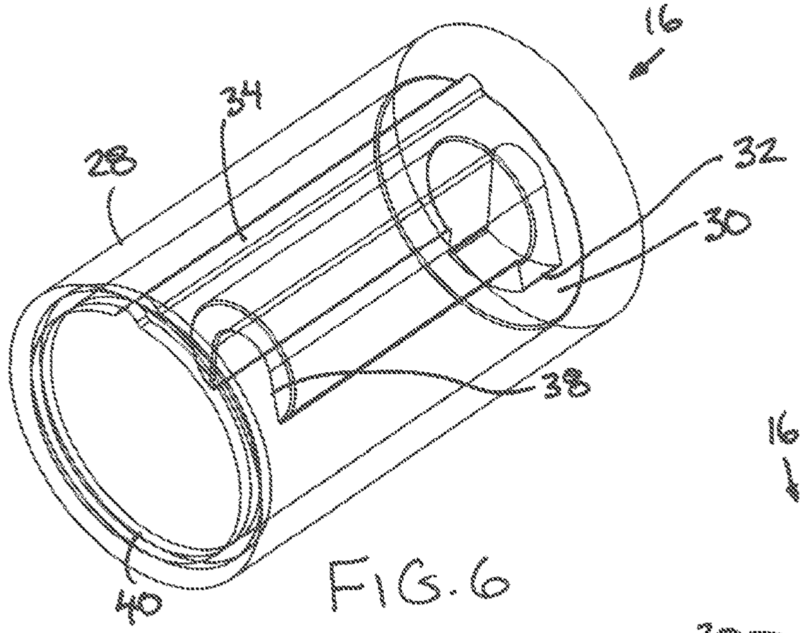
FIG. 6 is a perspective view of the lock housing of the locking system according to FIG. 1.
Figure 7:
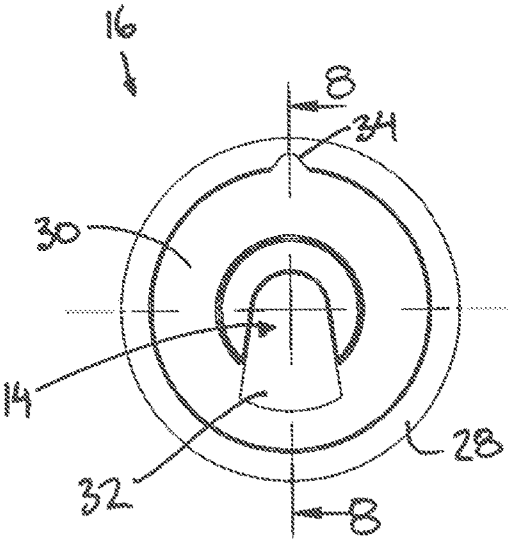
FIG. 7 is an end elevational view of the lock housing.
Figure 8:
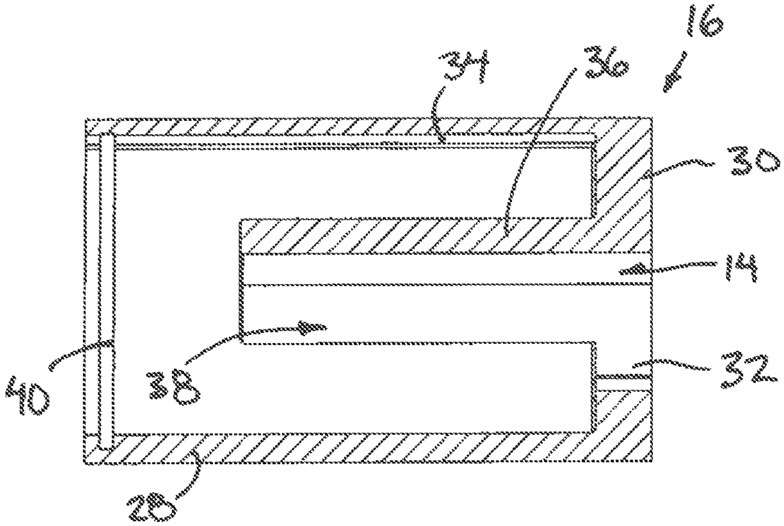
FIG. 8 is a sectional view along the line 8-8 in FIG. 7.
Figure 9:
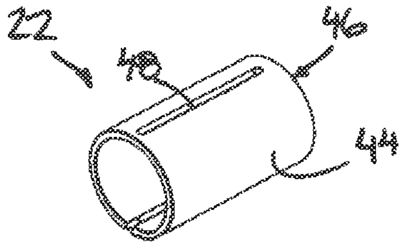
FIG. 9 is a perspective view of the lock cylinder of the locking system according to FIG. 1.
Figure 10:
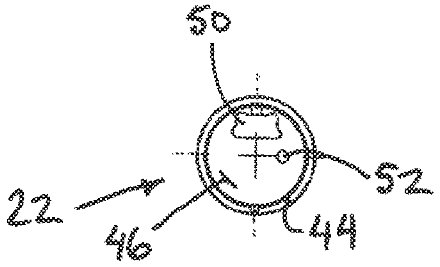
FIG. 10 is an end view of the lock cylinder.
Figure 11:
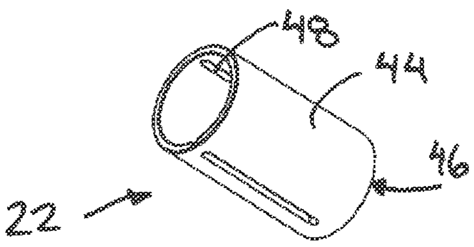
FIG. 11 is another perspective view of the lock cylinder.
Figure 12:
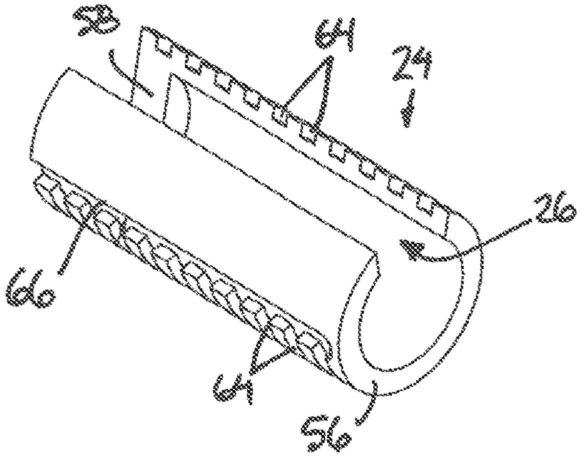
FIGS. 12, 13 and 14 are different perspective views of the idler block of the locking system according to FIG. 1.
Figure 13:
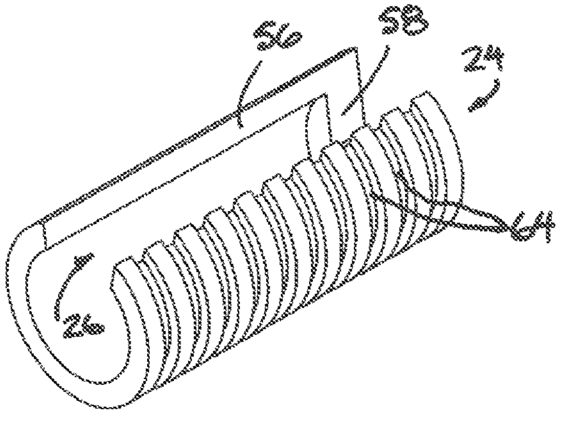
Figure 14:
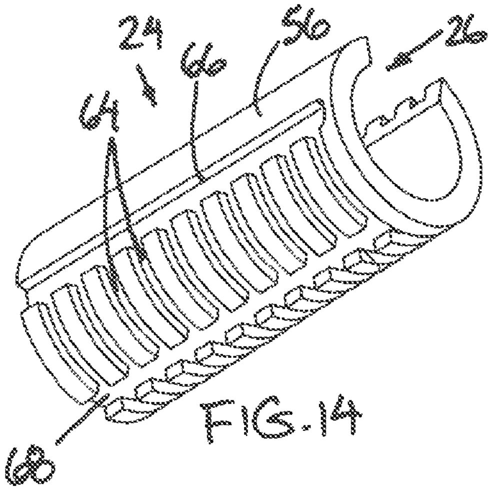
Figure 15:
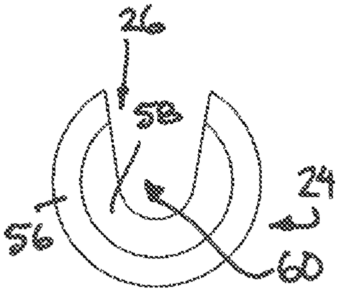
FIGS. 15, 16, and 17 are first end, side and second end views respectively of the idler block.
Figure 16:
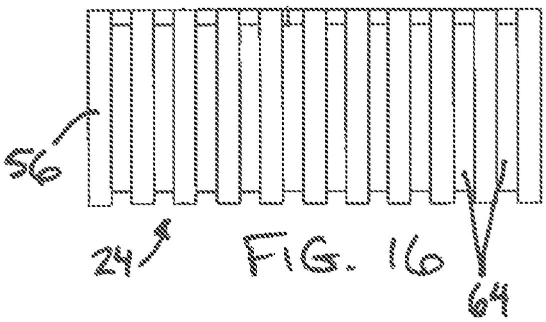
Figure 17:
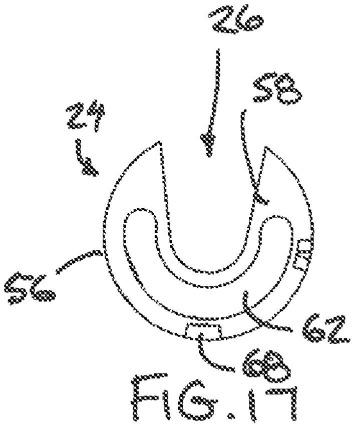
Figure 18:
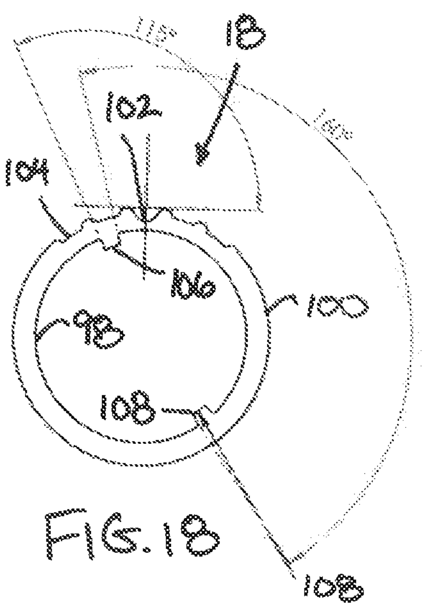
FIGS. 18 and 19 are end views of two different detainer discs of the locking system according to FIG. 1.
Figure 19:
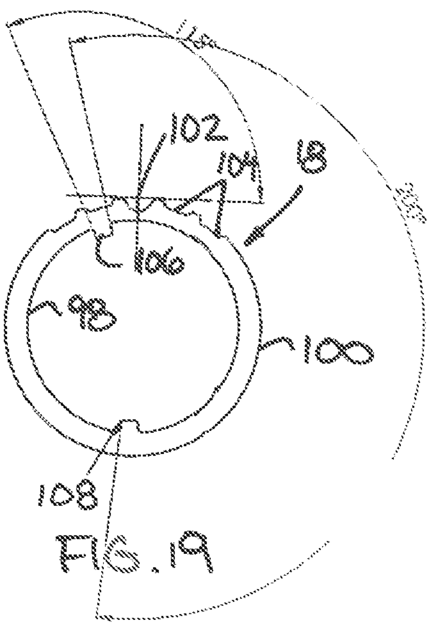
Figure 22:
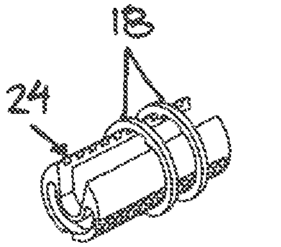
FIGS. 21 and 22 are different perspective views of the detainer discs supported on the idler block.
Figure 20:
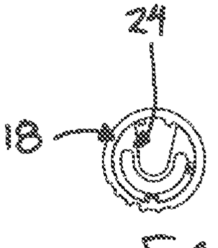
FIG. 20 is an end view of the detainer discs supported on the idler block.
Figure 21:
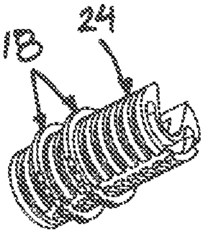
Figure 23:
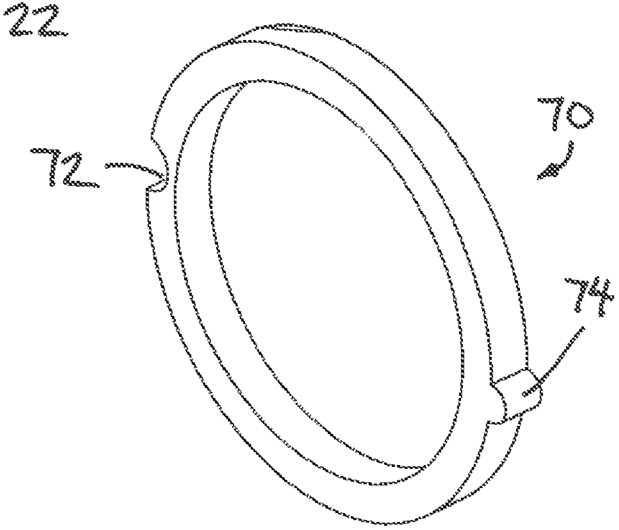
FIG. 23 is a perspective view of one of the spacer discs of the locking system according to FIG. 1.
Figure 24:
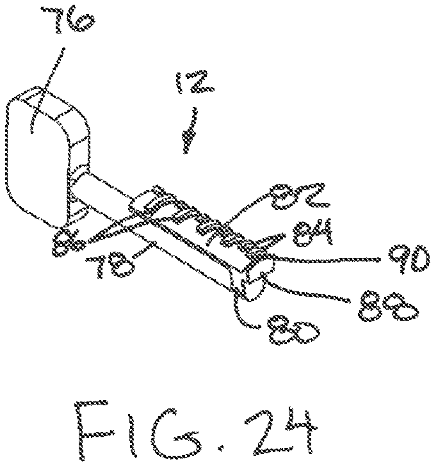
FIGS. 24 and 25 are different perspective views of the key of the locking system according to FIG. 1.
Figure 25:
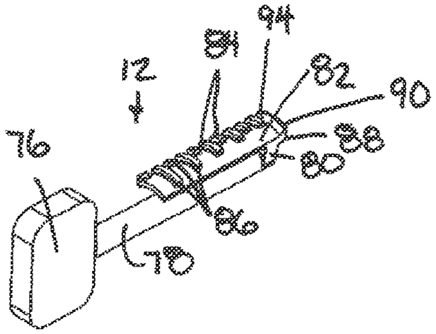
Figure 26:
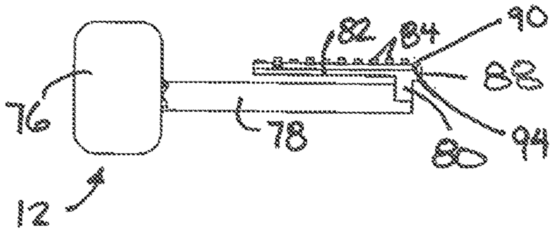
FIGS. 26 and 27 are side elevational and top plan view of the key.
Figure 27:
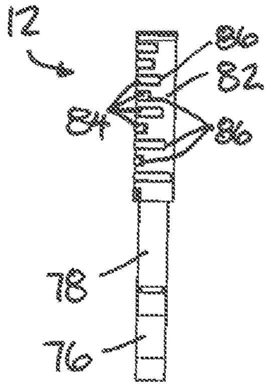

Turning now more particularly to the first illustrated embodiment of the locking system 10 shown in FIGS. 1 through 27, the lock housing 16 in this instance is a sleeve having an outer wall 28 that is cylindrical in shape and which spans substantially a full length of the lock assembly. A face plate 30 is supported at the outer end of the lock housing to span across one end of the outer wall 28. The face plate is generally circular in shape and is oriented perpendicularly to an axial direction of the outer wall. The face plate 30 locates the keyhole 14 therein.

In the first illustrated embodiment the keyhole includes a central portion aligned with a central axis of the outer wall 28 and a radial portion 32 joined with the central portion to extend in a first radial direction corresponding to the bottom of the lock assembly in the accompanying illustrations.

The lock housing also includes a first side bar channel 34 formed in the outer wall. The first side bar channel 34 is a groove recessed into the inner surface of the outer wall 28 of the lock housing at a location diametrically opposed from the radial portion 32 of the keyhole. The first side bar channel 34 is thus recessed into the inner surface at the top of the lock housing in the accompanying illustrations. The side bar channel is a linear groove which extends axially substantially a full length of the lock housing.

A stationary shield 36 is supported within the lock housing in fixed relation to the lock housing. The stationary shield in the illustrated embodiment is a tubular body which is fixed centrally on the faceplate 30 to extend axially inwardly along a majority of the length of the lock housing. The tubular body forming the stationary shield 36 includes a key channel 38 formed as an opening along one side of the tubular body. The stationary shield is this generally C shaped in cross-section along the full length thereof as the key channel 38 extends fully through the outer wall of the tubular body along the full length thereof. The key channel 38 is diametrically opposite the first side bar channel 34 such that the key channel 38 is aligned with the radial portion 32 of the keyhole 14. The inner end of the tubular body forming the stationary shield 36 remains open.

A retainer groove 40 is formed within the inner surface of the outer wall 28 of the lock housing adjacent the inner end thereof opposite from the faceplate 30. The circumferential retainer groove 40 extends about the full circumference of the lock housing within a plane oriented perpendicularly to the axial direction. In the assembled configuration of the lock assembly, a snap ring 42 can be received within the circumferential retainer groove 40 in abutment with the inner end of the lock cylinder 22 to axially retain the lock cylinder between the faceplate 30 at the outer end of the lock assembly and the snap ring 42 at the inner end of the lock assembly.

The lock cylinder 22 is a sleeve having a cylindrical outer wall 44 that has an outer diameter that closely fits rotatably within the inner diameter of the lock housing. The length of the lock cylinder in the axial direction spans the majority of the length of the lock housing so as to be axially abutted between the faceplate 30 at the outer end and the snap ring 42 at the inner end thereof. The outer wall 44 of the lock cylinder remains open at the outer end thereof so as to receive the stationary shield 36 extending therethrough in the assembled configuration. An end wall 46 is supported at the inner end of the outer wall 44 of the lock cylinder. The inner end wall 46 is oriented perpendicularly to the longitudinal axis of the lock cylinder.

The lock cylinder 22 includes a second side bar channel 48 formed therein. The second side bar channel 48 is an elongate slot spanning axially along the outer wall 44 of the lock cylinder along substantially the full length of the lock cylinder. The second side bar channel 48 is sized in axial length and width in the circumferential direction to be approximately equal to the corresponding dimensions of the first side bar channel with which it is aligned in a locked configuration of the lock assembly as described in further detail below.

The lock cylinder further includes a notch 50 formed in the inner end wall 46 ss a through-hole extending axially through the end wall at a location offset radially from the axis in the same direction locating the second side bar channel 48. The notch 50 interacts with the key 12 so as to allow the key and the lock cylinder to be selectively mated with one another for rotation together as described in further detail below.

The socket 52 is also formed in the end wall of the lock cylinder to receive a pin therein which functions as a first rotational stop to limit the range of rotational movement of the idler block 24 relative to the lock cylinder 22 as further described below.

An axial retainer groove 54 is formed in the inner surface of the lock cylinder to extend axially along substantially the full length of the lock cylinder. The axial retainer groove 54 is located diametrically opposite from the second side bar channel 48.

The side bar 20 of the lock system 10 is an elongated rigid body which fits within the second side bar channel 48 within the lock cylinder so as to be radially movable between a first position corresponding to a locked configuration of the assembly and a second position corresponding to an unlocked configuration of the assembly. In the first position, the side bar 20 traverses a shear plane between the lock cylinder and the lock housing such that the lock cylinder is fixed relative to the lock housing. In this instance, the side bar 20 is partly received within the second side bar channel in the lock cylinder and is partly received within the first side bar channel within the lock housing. The shear plane between the lock cylinder and the lock housing is oriented tangentially to the axis of rotation of the lock cylinder at the interface between the outer diameter of the lock cylinder and the inner diameter of the lock housing. In the second position, the shear plane between the lock housing and the lock cylinder is uninterrupted by the side bar by displacing the side bar radially inwardly relative to the first position until the side bar is fully contained within the cylindrical boundary of the lock cylinder. Accordingly, in the second position, rotation of the lock cylinder relative to the lock housing is enabled and not prevented by the side bar.

The idler block 24 of the lock assembly is received within the lock cylinder 22 while being rotatable about the stationary shield 36 that is disposed within the interior of the idler block in the assembled configuration. The idler block comprises a generally tubular body having a generally cylindrical shaped wall 56 with an opening extending axially along one side thereof along the full length of the idler block such that the open side defines the key channel 26 of the idler block that receives a portion of the key therein in operation. The resulting idler block 24 is generally C shaped in cross-section along the full-length thereof in the axial direction.

The inner diameter of the cylindrical shaped outer wall 56 of the idler block closely matches the outer diameter of the stationary shield 36. The outer end of the outer wall 56 of the idler block remains open to receive the stationary shield rotatably therethrough in the assembled configuration.

The outer diameter of the outer wall 56 of the other block is reduced relative to the inner diameter of the lock cylinder so as to define an annular gap between the outer surface of the idler block and the inner surface of the lock cylinder that is suitable for receiving the detainer discs 18 therein as described in further detail below. The idler block spans the full-length in the axial direction of the interior of the lock cylinder between the inner end wall 46 and the open outer end of the lock cylinder.

An inner end wall 58 is formed at the inner end of the cylindrical wall 56 of the idler block. The inner end wall 58 includes an opening 60 formed therein which is similar in shape to the keyhole 14 so as to include a central portion aligned with the axis and a radial portion extending in a radial offset direction to connect with the open side defining the key channel 26 within the idler block. The opening 60 within the inner end wall 58 is thus continuous with the key channel 26.

The circumferential groove 62 is formed in the end surface of the inner end wall to face axially inwardly towards the inner end wall 46 of the lock cylinder with which the end wall 58 is abutted in the assembled configuration. The circumferential groove 62 forms an arc centred at the central axis of the lock assembly at a radial distance from the central axis corresponding to the radial offset of the socket 52 that receives the pin defining the first rotational stop of the lock assembly. The circumferential groove 62 receives the pin mounted in the socket 52 of the lock cylinder slidably therein in the assembled configuration. As the idler block is rotated relative to the lock cylinder, the pin mounted within the socket 52 is displaced along the circumferential groove 62. The opposing ends of the groove 62 effectively define second rotational stops that interact with the first rotational stop defined by the pin in the socket 52 so as to define an overall prescribed range of rotational movement of the idler relative to the lock cylinder.

The idler block further includes a peripheral channel 64 formed in the outer surface of the outer wall 56 to extend partway about the circumference thereof in associated with each detainer disc. The peripheral channels 64 are axially spaced apart from one another such that each peripheral channel is aligned with a corresponding one of the detainer discs 18 in the assembled configuration. All of the channels 64 are open in the circumferential direction to the key channel along one circumferential boundary of the key channel in the idler block. The peripheral channels 64 are also closed at the opposing end by a common return ledge 66 formed at the other boundary of the key channel 26 within the idler block 24. The return ledge 66 defines a return surface interrupting each peripheral channel 64 for interaction with corresponding elements on the detainer discs as described in further detail below.

An assembly groove 68 is also formed in the outer surface of the idler block to extend axially along the full length of the idler block at a location which is diametrically opposite from the key channel 26. The assembly groove 68 has a depth in the radial direction corresponding approximately to the depth of the grooves defying the peripheral channels 64 respectively to assist in assembly of the detainer discs onto the idler block as described in further detail below.

In the assembled configuration, the detainer discs 18 surround the idler block to occupy the annular gap between the outer diameter of the idler block and the inner diameter of the lock cylinder within which the detainer discs are disposed. The detainer discs are axially spaced apart by a plurality of spacer discs 70 such that each axially adjacent pair of detainer discs within the overall set of discs receives a corresponding spacer disc 70 therebetween in axial abutment with one another. The spacer discs each have a prescribed thickness in the axial direction that defines the spacing between the detainer discs of each adjacent pair. The prescribed thickness of the spacer discs is greater than a corresponding axial thickness of each of the detainer discs 18.

Each spacer disc 70 is an annular body having an inner edge with an inner diameter that closely matches the outer diameter of the idler block. The annular body also has an outer edge with an outer diameter that closely matches the inner diameter of the surrounding lock cylinder. A side bar recess 72 is formed in the outer edge of each spacer disc for alignment with the second side bar channel 48 in the lock cylinder 22. The side bar recess allows a portion of the side bar 20 to be received therein in the second position of the side bar such that the spacer discs 70 do not provide any restriction to displacement of the side bar between the first and second positions.

Each spacer disc 70 further includes a retainer protrusion 74 formed to protrude radially outward beyond the boundary of the outer edge at a location diametrically opposite from the side bar groove 72. Each retainer protrusion 74 is received within the axial retainer groove 54 formed in the inner surface of the lock cylinder such that the corresponding spacer disc is fixed against relative rotation between the spacer disc and the lock cylinder. In this manner, the rotation of any one of the detainer discs does not transfer corresponding rotation to any adjacent detainer discs due to the spacer discs therebetween.

The key 12 in the illustrated embodiment is a deviated key having a grip 76 formed at one end of the key for gripping between fingers of a user. A shaft 78 extends axially from the grip 76 to define an axis of rotation of the key within the lock assembly. In the illustrated embodiment of a reverse fork key, the shaft 78 extends substantially the full length of the key so that a connecting portion 80 of the key can extend radially outward from the shaft 78 at a second end of the key opposite from the first end locating the grip 76 thereon. A deviated member 82 is provided on the key at a location spaced from the shaft 78 at the axis of rotation. The deviated member 82 is supported on the connecting portion 80 and extends generally parallel to the shaft 78 at a location spaced radially outward therefrom from the connecting portion 80 at the second end of the key towards the first end of the key.

When inserted into the keyhole 14, the shaft 78 is aligned with the central portion of the keyhole, whereas the deviated member 82 is received through the radial portion 32 of the keyhole. The deviated member 82 and the connecting portion 80 supporting the deviated member relative to the shaft are further arranged to be received through the key channel 26 in the idler block 24 and through the corresponding key channel 38 of the stationary shield 36 as the key is inserted into the lock.

The deviated member 82 occupies the circumferential gap in the idler block 24 once the key is inserted into the lock assembly. In this manner the insertion of the deviated member 82 of the key into the gap within the idler block couples the key and the idler block to rotate together about the axis of rotation of the lock assembly. When the key is rotated relative to the lock housing, the deviated member 82 is located radially outward relative to the stationary shield 36 so that the deviated member rotates about the exterior of the stationary shield without interference therebetween.

The deviated member 82 includes a plurality of nubs 84 formed on the outer surface thereof in which each nub is a protruding lug or body of material that is aligned with a corresponding one of the detainer discs 18 and with a corresponding one of the peripheral channels 64 in the idler block. Each nub 84 defines a respective keyed surface 86 thereon which can be cut away by grinding so that the location of the keyed surface can be varied between different positions in the circumferential direction about the axis of rotation of the key during formation of the key profile of the key. The keyed surfaces formed by the nubs 84 define the key profile of the key and serve to define a terminal surface at one end of the corresponding peripheral channel 64 opposite from the return surface forming a stop at the return ledge 66 at the opposing end of the peripheral channel. Similarly to the return surfaces formed on the return ledge 66, the keyed surfaces 86 on the key interact with the detainer discs to rotationally displace the detainer discs between locked and unlocked configurations as described in further detail below.

A protrusion 88 protrudes axially beyond the second end of the deviated member 82 at the second end of the key. The protrusion is arranged to abut the inner surface of the end wall 46 of the lock cylinder in a first translational position of the key upon initial insertion of the key into the lock assembly. When the key is rotated such that the protrusion 88 aligns with the notch 50 formed in the end wall of the lock cylinder, the key can subsequently be displaced translationally in the axial direction of the lock assembly from the first translational position to a second translational position with the protrusion 88 received within the notch 50. Until the protrusion is aligned with the notch, axial displacement of the key from the first translational position to the second translational position is prevented.

A side bar stop 90 is also formed on the deviated member at the second end of the key to protrude radially by a height similar to the height of the nubs 84 relative to the remainder of the deviated member 82. The side bar stop 90 is aligned with an end portion 92 of the side bar in the first translational position of the key once the key has been rotated from a first angular orientation corresponding to a locking orientation to a second angular orientation corresponding to an unlocking orientation of the key within the lock housing. The side bar stop 90 prevents the side bar from being displaced from the first position or locked configuration to the second position or unlocked configuration until the key has been displaced into the second translational position, regardless of the configuration of the detainer discs 18 being in locked or unlocked configurations. If the detainer discs are also in an unlocked orientation, when the key is in the second translational position, the side bar can be displaced from the first position to the second position corresponding to the unlocked configuration thereof.

When it is desired to return the side bar to a locked configuration corresponding to the first position thereof, the key can be displaced translationally in the axial direction from the second translational position to the first translational position. In this regard, a ramped surface 94 is formed on the inner end of the side bar stop 90 to be sloped radially outward and axially outward towards the second end of the key for interaction with a similarly sloped surface 96 formed on the end portion 92 of the side bar. The interaction of the sloped surfaces urges the side bar into the first position responsive to translational movement of the key towards the first translational position.

Each detainer disc 18 is an annular body having a circular inner edge 98 with an interior diameter that closely fits with the outer diameter of the idler block to allow for relative rotation therebetween. The annular body also includes a circular outer edge 100 having an outer diameter which fits within the inner diameter of the lock cylinder to similarly allow relative rotation therebetween.

A gate channel 102 is formed as a recess or notch which is recessed inwardly relative to the outer edge 100 within each detainer disc 18. The depth of the gate channel 102 is sufficient that when aligned with the second side bar channel of the lock cylinder, the corresponding detainer disc will not interfere with displacement of the side bar from the first position to the second position corresponding to the unlocked configuration thereof. When the gate channel 102 is not aligned with the second side bar channel 48 in the lock cylinder, the remainder of the outer edge 100 of the detainer disc prevents movement of the side bar into the second position. Accordingly the side bar is prevented from displacement into the second position until the gate channel 102 of each detainer disc is aligned with the second side bar channel 48 together with displacement of the key translationally from the first translational position to the second translational position thereof.

Each detainer disc 18 further includes a plurality of false gates 104 formed as recesses within the outer edge but which have a depth which is less than the depth of the gate channel 102 such that even if one of the false gates is aligned with the second side bar channel 48 in the lock cylinder, the depth of the false gate 104 prevents displacement of the side bar channel fully into the second position thereby maintaining the side bar in a locked configuration that prevents relative rotation between the lock cylinder and the lock housing.

Each detainer disc further includes a key bit 106 formed as a protruding lug on the inner edge to extend radially inward relative to the remainder of the inner edge of the detainer disc. The key bit is sized to be received within a corresponding one of the peripheral channels 64 in the idler block so that the key bit 106 travels circumferentially along the peripheral channel as the idler block is rotated relative to the detainer disc. The key bit 106 is further arranged to be engaged by a corresponding keyed surface 86 of one of the nubs 84 on the key at one end of the peripheral channel.

Each key bit 106 is positioned such that when the key is inserted in the first angular orientation and rotated 180 degrees to the second angular orientation, the keyed surfaces of the key will engage the key bits 106 of the respective detainer discs 18 associated therewith to rotate the detainer discs together with the idler block until the gate channels 102 of all detainer discs are aligned with the second side bar channel 48 in the lock cylinder.

When in the second angular orientation of the key corresponding to the unlocking orientation, the direction of offset and the circumferential space between the engaging surface of each key bit 106 to the centre of the respective gate channel 102 is approximately equal to the direction of offset and circumferential space from the corresponding keyed surface of the key to the centre of the side bar channel or the centre of the key. Between the different detainer discs, the space in the circumferential direction and direction of offset of the key bit 106 relative to the gate channel 102 varies, however, by similarly varying the keyed surfaces so that the circumferential offsets of the key bits match the circumferential offsets of the corresponding keyed surfaces of the key, the rotation of the key to a single second angular orientation allows all detainer discs to be commonly aligned in the unlocking configuration thereof.

Each detainer disc 18 further includes a return bit 106 also formed at the inner edge as a protrusion extending radially inwardly to be received within a respective one of the peripheral channels 64 of the idler block. The return bits 108 are engaged by the corresponding return surfaces formed on the return ledge 66 of the idler block as the idler block is rotated from the second angular orientation to the first angular orientation thereof.

The profile of the return ledge 66 can assume various nonlinear shapes such that the return surfaces for alignment with each detainer disc can vary in angular position relative to other return surfaces if it is desired to more randomly locate the detainer discs relative to one another when the key is rotated back to the first angular orientation thereof. The return bits can also be varied in location in the circumferential direction along each detainer disc independent of the location of the key bit 106 relative to the gate channel 102 of the corresponding detainer disc so that the amount of rotation each detainer disc undergoes as the key is rotated from the second angular orientation to the first angular orientation can vary. For ease of assembly, the return bit on each detainer disc should be offset in the circumferential direction from the centre of the return bit to the centre of the key bit 106 on the same detainer disc within a range of approximately 160° to 200° according to the illustrated embodiment.

The range of offset is determined by the location of the assembly groove 68 on the idler block relative to the boundaries of the key channel. By locating the assembly groove diametrically opposite from the key channel and forming the key channel to occupy a gap of approximately 40° in the circumferential direction between opposing boundaries thereof, the prescribed range of offset of the return bits from the gate channels will ensure that if the return bit is inserted within the assembly groove 68 during assembly, the respective key bit 106 will be aligned between the boundaries of the opposing key channel to allow the detainer disc to be axially displaced along the idler block to the desired mounted position relative to the idler block. Locating the assembly groove at a different location relative to the key channel would accordingly result in a different range of offsets between the return bits and the corresponding key bits being permitted for assembly.

In use, prior to insertion of the key, the detainer discs are typically in a locked configuration corresponding to misalignment of the gate channels 102 thereof relative to the second side bar channel 48 in the lock cylinder such that the side bar is held in the first position in interference with relative rotation between the lock cylinder and the lock housing. The key is initially inserted into the keyhole in the first angular position corresponding to the locked orientation until the protrusion 88 at the second end of the key abuts the end wall corresponding to the first translational position of the key relative to the lock housing. As the key is inserted, the connecting portion 80 of the key between the deviated member and the shaft 78 passes through the key channel 38 of the stationary shield 36 while the deviated member is received within the key channel 26 of the idler block 24.

Subsequently rotating the key in an unlocking direction of rotation towards the second angular position results in the keyed surfaces of the key 12 engaging the respective key bits 106 on the detainer discs at different angular positions in the circumferential direction. Continued rotation of the key towards the second angular position results in the idler block being continued to rotate with the key about the stationary shield 36. Once the key reaches the unlock orientation or the second angular position thereof, the protrusion 88 at the second end of the key aligns with the notch 50 in the end wall of block housing to allow translational movement of the key from the first translational position to the second translational position.

The axial distance of the translational movement between the first and second translational positions is less than the prescribed axial thickness of the spacer discs to ensure that each keyed surface remains aligned with the corresponding key bit and corresponding detainer disc 18 supporting the key bit 106 thereon without interference with adjacent detainer discs or key bits. The axial distance of the translational movement between the two translational positions may be greater than the axial width of the peripheral channels 64 and the detainer discs that cooperate with the peripheral channels while still maintaining some axial overlap of each nub 84 on the key with the respective key bit 106 of the lock assembly to maintain alignment of the gate channels with the second side bar channel 48 of the lock cylinder during translation of the key in the second angular position of the key.

The gate channels are removed as an obstruction to movement of the side bar from the first position to the second position thereof once the key reaches the second angular position by rotation thereof; however, the side bar remains blocked from displacement into the second position or unlocked configuration thereof until the side bar stop 90 on the key is moved to a non-interfering position with the side bar by translational movement of the key from the first translational position to the second translational position thereof. The side bar is then free to be displaced into the second position or unlocked configuration. In addition to displacement of the side bar into the second position in non-interference with the rotation between the lock cylinder and the lock housing, the corresponding insertion of the protrusion 88 at the second end of the key into the notch 50 fixes the key to rotate together with the lock cylinder. In this manner the lock cylinder can be operated in either direction of rotation relative to the lock housing together with the key while the side bar remains in the second position or unlocking configuration thereof.

To return the lock assembly to a locked configuration, the key is positioned in the second angular position resulting in the second side bar channel being again aligned with the first side bar channel in the lock housing. Until the side bar channels are aligned, the side bar is held in the second position or unlocked configuration within the lock cylinder by the inner surface of the lock housing 16, thus preventing translational movement of the key from the second translational position to the first translational position until the key returns the lock cylinder to the second angular position with the side bar channels aligned. Once in the second angular position, the key is then displaced translationally from the second translational position to the first translational position so that the ramped surface 94 on the key engages the corresponding sloped surface 96 on the side bar to lift the side bar into the first position or locked configuration thereof.

Subsequent turning of the key relative to the lock housing from the second angular position to the first angular position in a locking direction causes the idler block to be rotated relative to the lock cylinder while the lock cylinder remains in a locked configuration fixed to the lock housing by the side bar in the first position. As the idler block is rotated within the lock assembly towards the first angular position, the return surfaces formed on the return ledge 66 will engage the return bits 108 of the detainer discs to return the detainer discs into a misaligned or locked configuration where the gate channels 102 thereof are misaligned with the side bar and the second side bar channel 48 of the lock cylinder. The key can be removed once returned to the first angular position. Once the key is removed, the idler block and the stationary shield provide considerable obstructions along the picking path between the keyhole 14 and the detainer discs 18 of the lock assembly to considerably limit any possibility of picking the lock.

Figure 28:
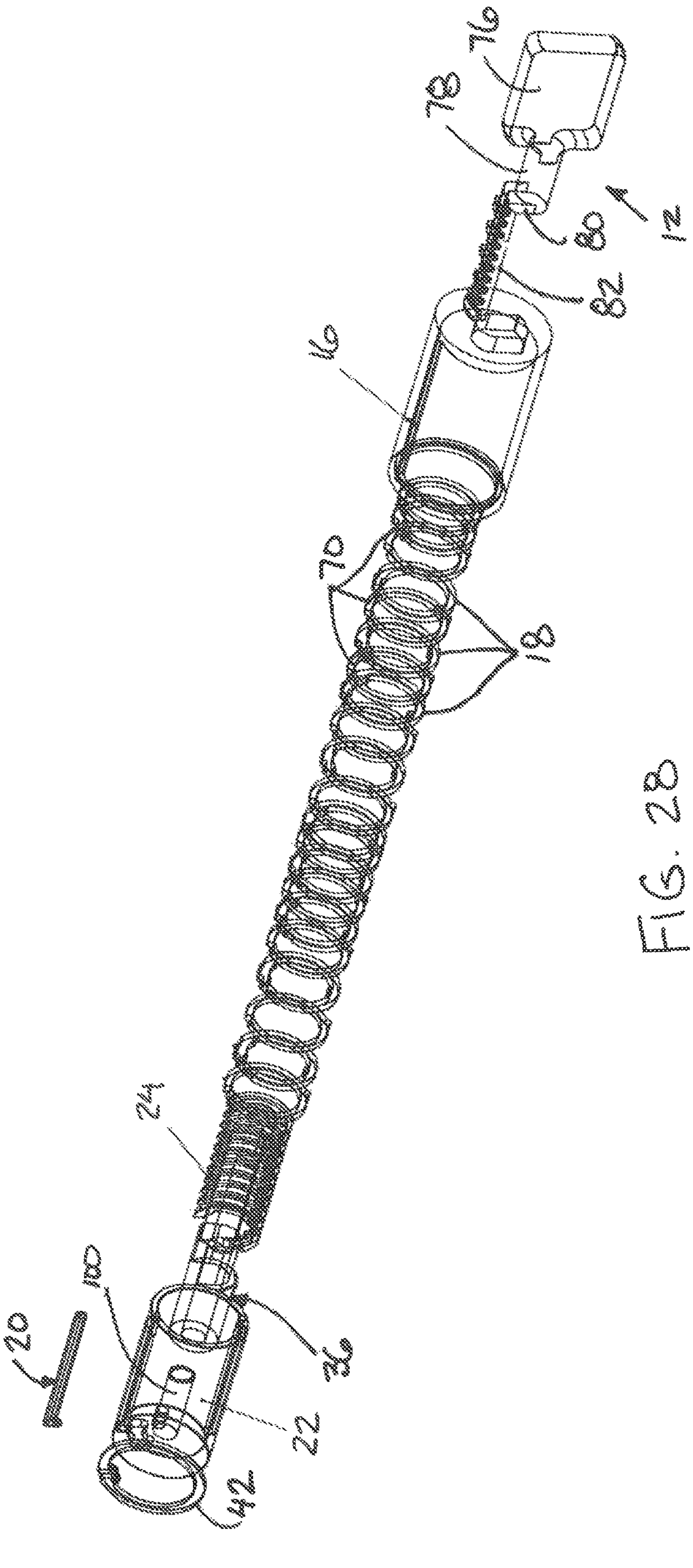
FIGS. 28 to 39 illustrate various views of a second embodiment of the locking system and corresponding key.
Figure 29:
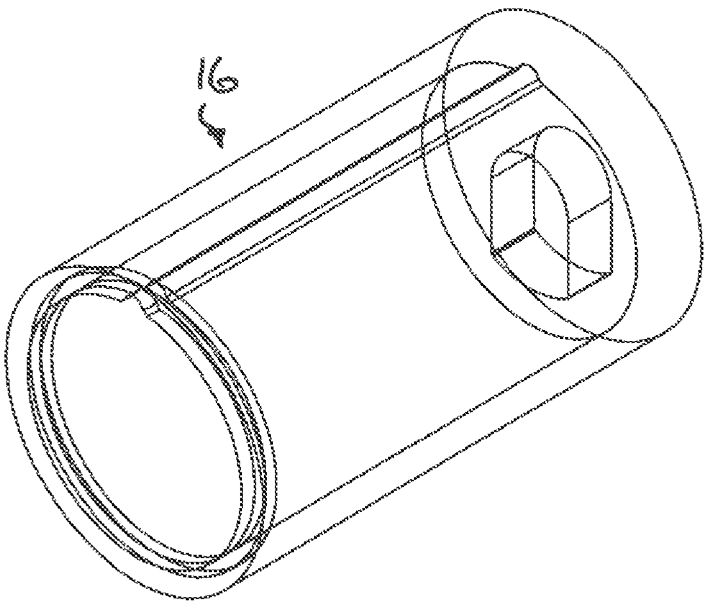
Figure 30:
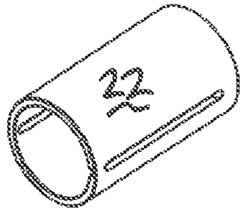
Figure 31:
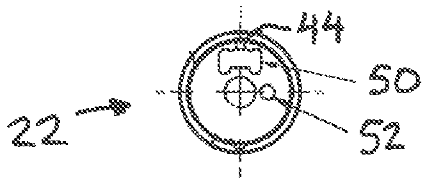
Figure 39:
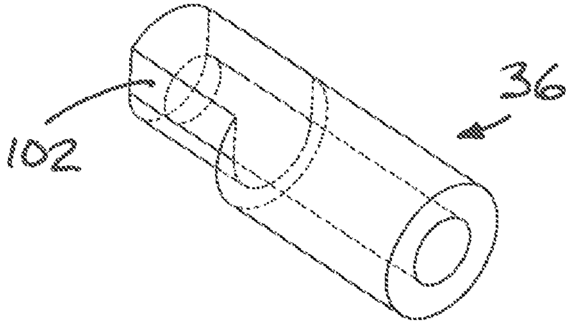
Figure 33:
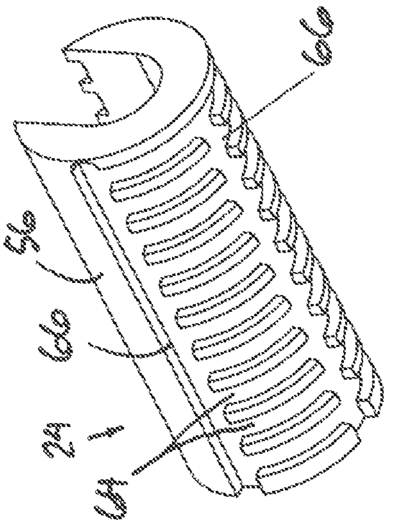
Figure 35:
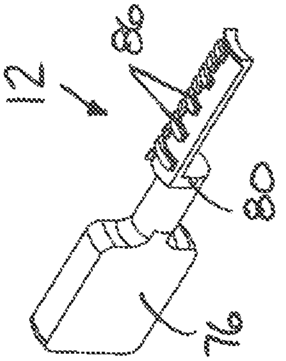
Figure 32:
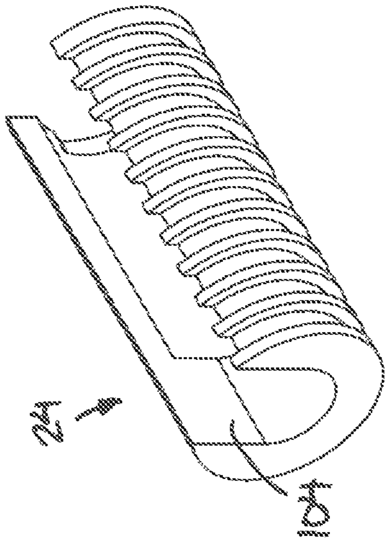
Figure 34:
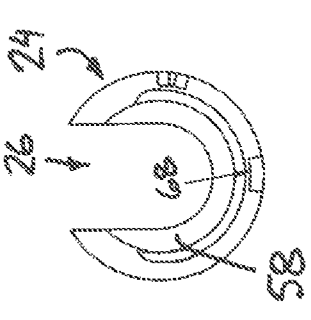
Figure 37:
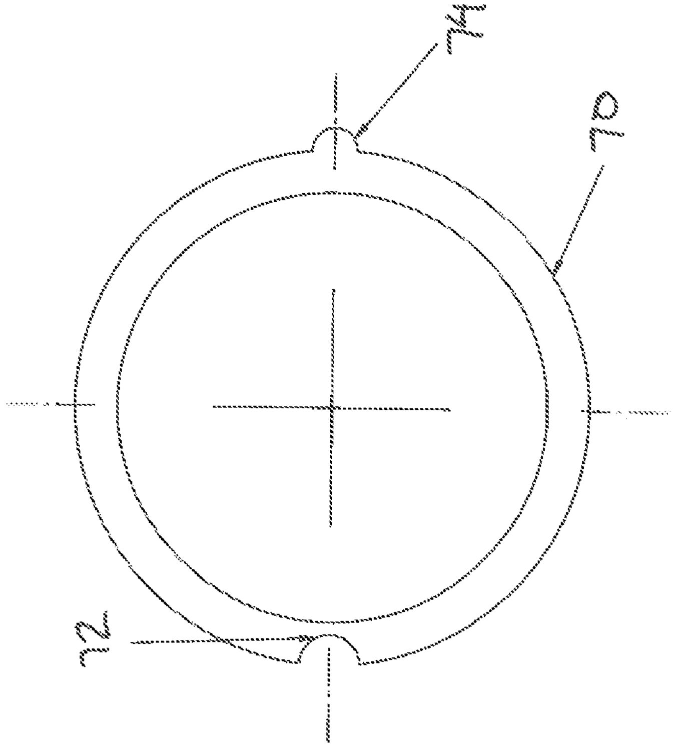
Figure 36:
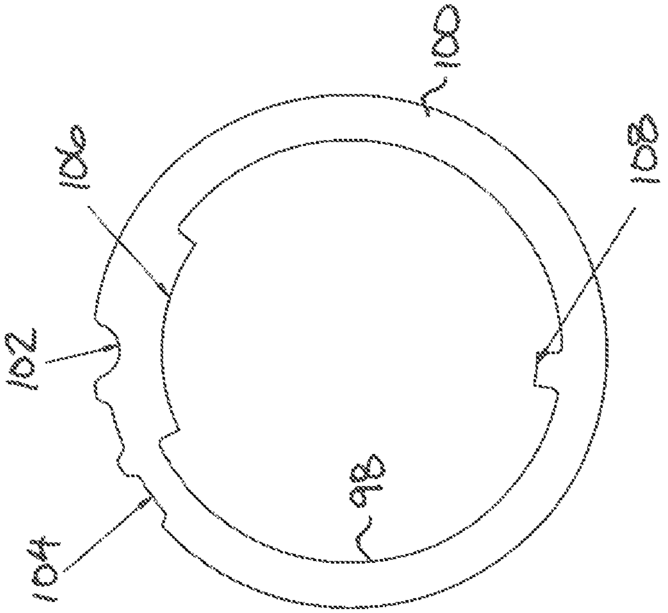
Figure 38:
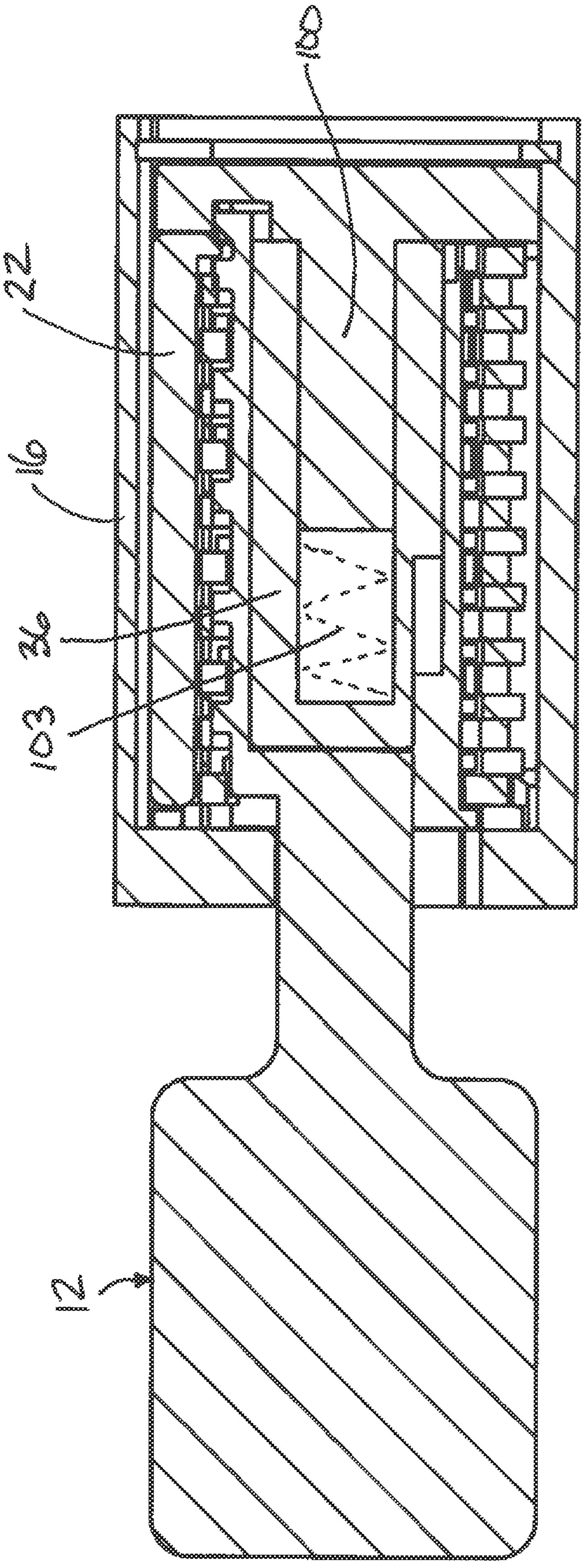

In a further embodiment as shown in FIGS. 28 to 39, the key 12 may be a forked key in which the connection portion that joins the deviated member to the shaft is located nearer to the grip at the first end of the key. In this instance, the shield 36 may instead be supported rotatably on an axle 100 fixed onto the inner end of the lock cylinder 22 opposite to the keyhole in the faceplate. The deviated member locating the keyed surfaces defining the key profile would again be received within a key channel in the idler block so as to be rotated with the idler block. The shield 36 in this instance is shaped at the outer end 102 to mate with a corresponding profile 104 on the idler block so that the shield is axially slidable relative to the idler block, while being connected for rotation together about a central axis of the lock assembly. A spring 103 mounts under compression between the end of the axle 100 and an end wall at the outer end 102 of the shield to urge the shield outwardly into engagement with the faceplate when the key is removed. The engagement of the shield 36 with the faceplate and/or keyhole in the faceplate will lock the orientation of the idler block relative to the lock housing while the key is removed to maintain alignment of the key channel 26 in the idler block relative to the key hole, thus ensuring that the key can be readily re-inserted at a later time. The outer surface of the shield 36 is reduced in diameter relative to the outer diameter of the idler block so that the resulting radial gap between the outer surface of the shield 36 and the outer surface of the idler block is occupied by the deviated member 82 of the key when the key is inserted into the lock assembly. Insertion of the key into the lock assembly will push the shield 36 inwardly against the biasing of the spring acting the shield to accommodate the connecting portion 80 of the key within the resulting axial gap between the outer end of the shield 36 and the inner surface of the faceplate of the lock housing during rotation of the key within the lock assembly.

Figures 40A, 40B:
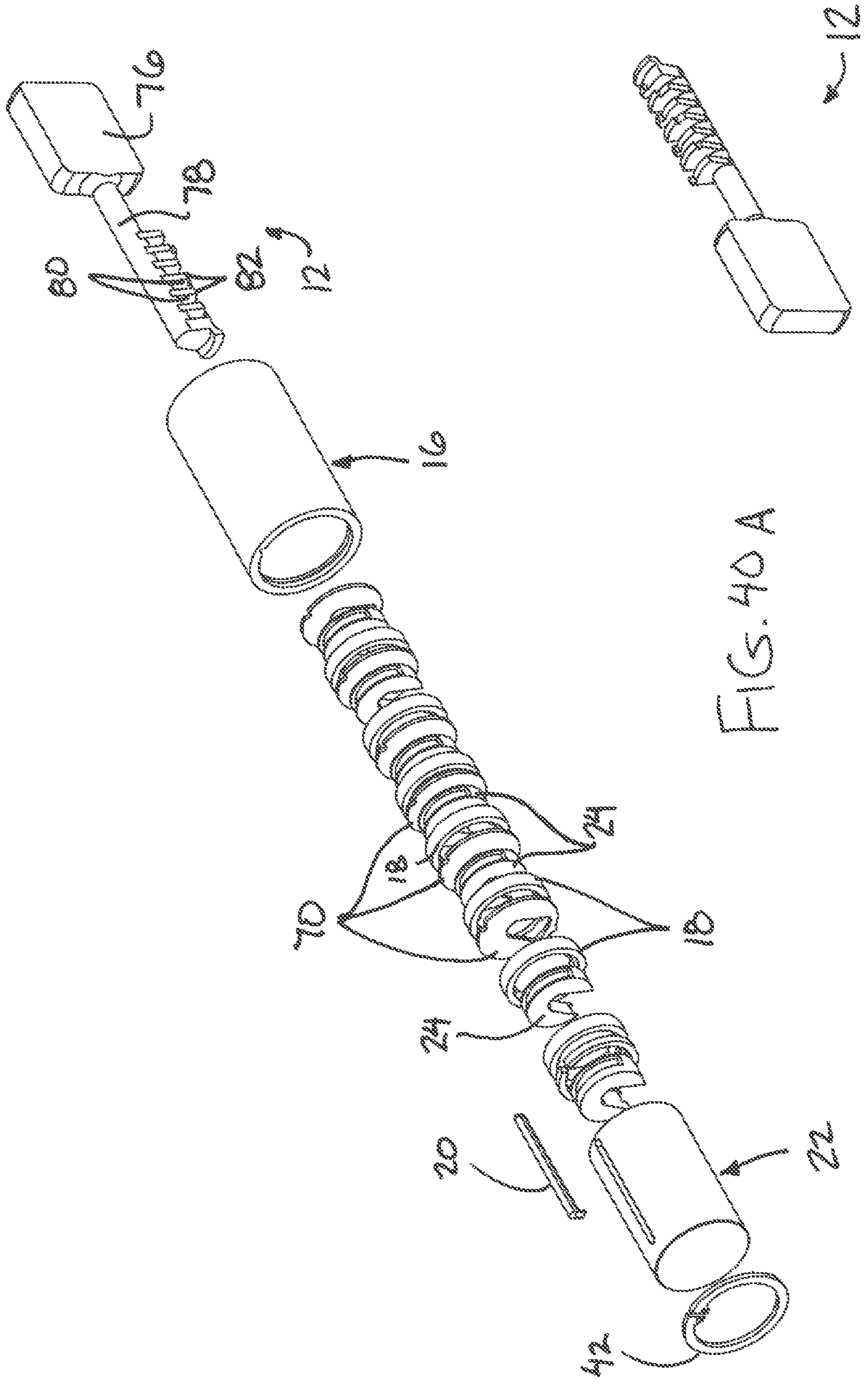
FIGS. 40A to 40D illustrate various views of a third embodiment of the locking system and corresponding key.
Figure 40D:
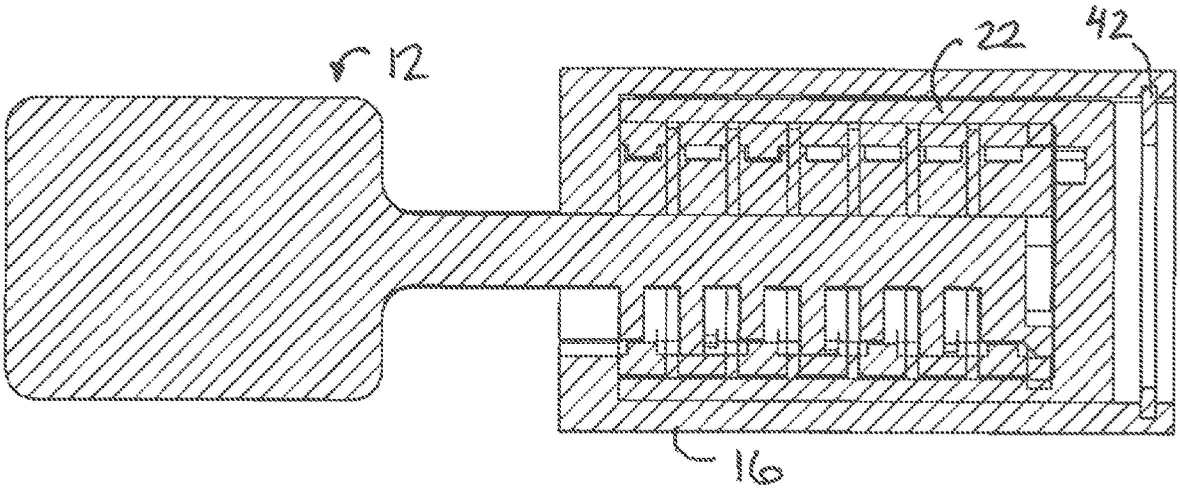
Figure 40C:
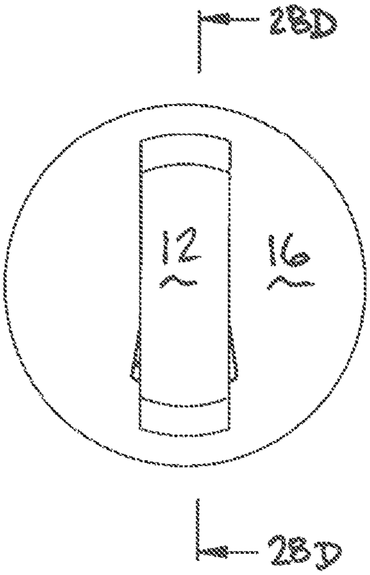

In a further embodiment shown in FIGS. 40A to 40D, the key may include more than one connection portion 80 supporting different sections of the deviated member 82 that locates the keyed surfaces thereon. In this instance, the spacer discs 70 may be modified to provide the function of the stationary shield, while the idler block 24 would be formed in sections between the spacer discs.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A detainer disc locking system comprising:

a key defining a deviated fork;

a lock housing including a face plate with a keyhole for receiving the key and a first side bar channel formed in the lock housing;

a lock cylinder disposed within the lock housing so as to be selectively rotatable relative to the lock housing, the lock cylinder including a second side bar channel formed in the lock cylinder;

a side bar at least partially received within the second side bar channel and being movable between a first position in which the side bar traverses a shear plane between the lock cylinder and the lock housing such that the lock cylinder is fixed relative to the lock housing and a second position in which a shear plane between the lock housing and the lock cylinder is uninterrupted by the side bar so as to enable rotation of the lock cylinder relative to the lock housing;

an idler block disposed within the lock cylinder, the idler block including a key channel arranged to receive the key therein when the idler block is aligned with the keyhole in first angular orientation of the idler block relative to the lock cylinder whereby the idler block is rotatable with the key relative to the lock cylinder; and a plurality of detainer discs disposed within the lock cylinder, each detainer disc being annular in shape and being supported about the idler block so as to be rotatable relative to the idler block and rotatable relative to the lock cylinder, and each detainer disc further comprising (i) a gate channel formed at an outer edge of the detainer disc such that the detainer disc blocks movement of the side bar into the second position until the gate channel is aligned with the second side bar channel and (ii) a key bit formed at an inner edge of the detainer disc;

the key including a plurality of keyed surfaces on the deviated fork in which the keyed surfaces form a key profile of the key, each keyed surface being aligned with a respective one of the detainer discs such that rotation of the key and the idler block relative to the lock cylinder in an unlocking direction from the first angular orientation towards a second angular orientation corresponding to an unlocking orientation of the key causes the keyed surfaces of the key to engage the key bits of the detainer discs respectively so as to align the gate channels of the detainer discs with the second side bar channel in the lock housing; and the idler block at least partially blocking access along a picking path between the keyhole and the detainer discs in the second angular orientation of the idler block relative to the first angular orientation of the idler block whereby the idler block produces a deviated path receiving the deviated fork of the key therein in the second angular orientation.

2. The locking system according to claim 1 further comprising a stationary shield supported in fixed relation to the lock housing, the stationary shield being disposed within the idler block such that the idler block rotates about the stationary shield.

3. The locking system according to claim 2 wherein the key includes a shaft portion defining an axis of rotation of the key and the deviated fork comprises a deviated member spaced from the axis of rotation of the key for rotation about the stationary shield, the keyed surfaces of the key being located on the deviated member of the key.

4. The locking system according claim 2 wherein the key includes a connecting portion extending between the shaft portion and the deviated member, and wherein the stationary shield comprises a tubular body having an opening extending axially along one side of the tubular body through which the connecting portion of the key is received when the key is inserted through the keyhole into the lock housing.

5. The locking system according to claim 2 wherein the stationary shield is supported on the face plate of the lock housing.

6. The locking system according to claim 1 wherein the idler block includes a plurality of peripheral channels formed in an outer surface thereof to extend in a circumferential direction about the idler block, each peripheral channel being aligned with a respective one of the detainer discs so as to receive the key bit of the respective detainer disc circumferential slidable therein as the idler block is rotated relative to the detainer discs.

7. The locking system according to claim 1 wherein each detainer disc further comprises a return bit formed at the inner edge of the detainer disc at a location spaced circumferentially from the key bit, whereby rotation of the key in a locking direction opposite to the unlocking direction away from the unlocking orientation causes the detainer discs to be rotated through engagement of the return bits so as to misalign the gate channels with the side bar.

8. The locking system according to claim 1 further comprising a stop formed on the key that is arranged to block release of the side bar into the second position in a first translational position of the key relative to the lock housing, and the key being movable translationally relative to the lock housing from the first translational position to a second translational position while the key is in the unlocking orientation, the side bar being movable into the second position in the second translational position of the key relative to the lock housing.

9. The locking system according to claim 8 wherein the key comprises a ramp surface formed thereon, the ramp surface being arranged to engage the side bar to urge the side bar from the second position to the first position thereof as the key is displaced translationally from the second translational position to the first translational position.

10. The locking system according to claim 8 further comprising a spacer disc supported between each adjacent pair of the detainer discs in an axial direction, the spacer discs each having a prescribed thickness in the axial direction, and the key being movable translationally between the first translational position and the second translational position by a distance which is less than the prescribed thickness of the spacer discs.

11. The locking system according to claim 8 further comprising a protrusion formed on the key and a notch formed within the lock cylinder that is arranged to receive the protrusion on the key when the key is displaced translationally into the second translational position, the lock cylinder being coupled to the key for rotation together when the protrusion is received within the notch.

12. The locking system according to claim 11 wherein the protrusion blocks translational movement of the key from the first translational position to the second translational position until the key is rotated into the unlocking orientation to align the protrusion on the key with the notch in the lock cylinder.

13. The locking system according to claim 1 further comprising rotational stops supported on each of the lock cylinder and the idler block that engage at opposing ends of a prescribed range of rotational movement between the lock cylinder and the idler block to prevent relative rotation beyond said prescribed range of rotational movement.

14. The locking system according to claim 13 wherein the rotational stops comprise a pin on a wall of the lock cylinder and a slot extending in a circumferential direction within the idler block, the slot receiving the pin therein such that movement of the pin between opposing ends of the slot defines said prescribed range of rotational movement between the lock cylinder and the idler block.

15. A detainer disc locking system comprising:

a key defining a deviated fork;

a lock housing including a face plate with a keyhole for receiving the key and a first side bar channel formed in the lock housing;

a lock cylinder disposed within the lock housing so as to be selectively rotatable relative to the lock housing, the lock cylinder including a second side bar channel formed in the lock cylinder;

a side bar at least partially received within the second side bar channel and being movable between a first position in which the side bar traverses a shear plane between the lock cylinder and the lock housing such that the lock cylinder is fixed relative to the lock housing and a second position in which a shear plane between the lock housing and the lock cylinder is uninterrupted by the side bar so as to enable rotation of the lock cylinder relative to the lock housing;

an idler block disposed within the lock cylinder, the idler block including a key channel receiving the key therein such that the idler block is rotatable with the key relative to the lock cylinder; and a plurality of detainer discs disposed within the lock cylinder, each detainer disc being annular in shape and being supported about the idler block so as to be rotatable relative to the idler block and rotatable relative to the lock cylinder, and each detainer disc further comprising (i) a gate channel formed at an outer edge of the detainer disc such that the detainer disc blocks movement of the side bar into the second position until the gate channel is aligned with the second side bar channel and (ii) a key bit formed at an inner edge of the detainer disc;

the idler block at least partially blocking access to the detainer discs;

the key including a plurality of keyed surfaces forming a key profile of the key, each keyed surface being aligned with a respective one of the detainer discs such that rotation of the key relative to the lock housing in an unlocking direction towards an unlocking orientation of the key causes the keyed surfaces of the key to engage the key bits of the detainer discs respectively so as to align the gate channels of the detainer discs with the second side bar channel in the lock housing;

wherein each detainer disc further comprises a return bit formed at the inner edge of the detainer disc at a location spaced circumferentially from the key bit, whereby rotation of the key in a locking direction opposite to the unlocking direction away from the unlocking orientation causes the detainer discs to be rotated through engagement of the return bits so as to misalign the gate channels with the side bar; and wherein the idler block includes a return surface formed on the idler block, the return surface of the idler block engaging the return bits when the key is rotated in the locking direction so as to cause the detainer discs to be rotated and the gate channels to be misaligned with the side bar.

16. A method of operating a detainer disc locking system comprising (i) a lock housing, (ii) a lock cylinder disposed within the lock housing, (iii) a side bar preventing rotation of the lock cylinder relative to the lock housing in a locked configuration, and (iv) a plurality of detainer discs disposed within the lock cylinder to prevent release of the side bar from the locked configuration while the detainer discs remain in a blocking configuration, the method comprising:

inserting a key into the idler block within the lock housing;

rotating the key relative to the lock housing from a first angular orientation to a second angular orientation so as to release the detainer discs from the blocking configuration;

blocking the release of the side bar from the locked configuration using the key in the second angular orientation in a first translational position of the key; and moving the key translationally relative to the lock housing while in the second angular orientation from the first translational position to a second translational position to release the side bar from the locked configuration.

17. The method according to claim 16 further comprising inserting a protrusion on the key into a notch within the lock cylinder when moving the key translationally relative to the lock housing into the second translational position such that the lock cylinder rotates with the key.

18. The method according to claim 17 further comprising blocking translational movement of the key in the first angular orientation from the first translational position to the second translational position using the protrusion on the key and rotating the key from the first angular orientation to the second angular orientation to align the protrusion on the key with the notch in the lock cylinder.

19. The method according to claim 16 further comprising providing an idler block rotatably disposed within the lock cylinder to partially block access to the detainer discs.

20. The method according to claim 16 further comprising moving the side bar into the locked configuration by engaging the side bar with a ramp formed on the key while displacing the key from the second translational position to the first translational position.

* * * * *